United States Patent [19]
Danesi et al.

[11] Patent Number: 4,477,631
[45] Date of Patent: Oct. 16, 1984

[54] PROCESS FOR PREPARING POLYOLEFINIC ELASTOMERIC COMPOSITIONS BY DYNAMIC VULCANIZAION

[75] Inventors: Sergio Danesi; Sergio Forti; Michele Manica, all of Ferrara, Italy

[73] Assignee: Montedison S.p.A., Milan, Italy

[21] Appl. No.: 563,174

[22] Filed: Dec. 19, 1983

Related U.S. Application Data

[63] Continuation of Ser. No. 408,691, Aug. 16, 1982, abandoned, which is a continuation of Ser. No. 293,247, Aug. 17, 1981, abandoned.

[30] Foreign Application Priority Data

Aug. 19, 1980 [IT] Italy ................................ 24213 A/80

[51] Int. Cl.$^3$ ............................................. C08L 61/10
[52] U.S. Cl. .................................. 525/133; 525/139; 525/140; 525/141
[58] Field of Search ............... 525/133, 139, 140, 141, 525/232; 524/509

[56] References Cited

U.S. PATENT DOCUMENTS

| | | | |
|---|---|---|---|
| 3,037,954 | 6/1962 | Gessler et al. | 260/33.6 PQ |
| 3,758,643 | 9/1973 | Fischer | 525/191 |
| 3,806,558 | 4/1974 | Fischer | 525/198 |
| 3,862,106 | 1/1975 | Fischer | 525/211 |
| 3,909,463 | 9/1975 | Hartman | 525/133 |
| 3,957,919 | 5/1976 | Von Bodungen et al. | 525/211 |
| 4,059,651 | 11/1977 | Smith, Jr. | 525/155 |
| 4,130,534 | 12/1978 | Coran et al. | 525/133 |
| 4,130,535 | 12/1978 | Coran et al. | 525/232 |
| 4,311,628 | 1/1982 | Abdou-Sabet et al. | 525/133 |

*Primary Examiner*—Theodore E. Pertilla

[57] ABSTRACT

Plasto-elastomeric compositions are prepared which are endowed with an improved processability and consist of a blend or mix of EPDM rubber cross-linked with a thermoplastic olefinic polymer, by means of dynamic vulcanization, using as a cross-linking agent for the rubber a halogen-donor-free system consisting of a phenolic non-halogenated resin and a particular oxide or metal carbonate.

5 Claims, No Drawings

PROCESS FOR PREPARING POLYOLEFINIC ELASTOMERIC COMPOSITIONS BY DYNAMIC VULCANIZAION

BACKGROUND OF THE INVENTION

This is a continuation of application Ser. No. 408,691, filed Aug. 16, 1982, now abandoned, which in turn is a continuation of Ser. No. 293,247, filed Aug. 17, 1981 (now abandoned).

The preparation of compositions based on thermoplastic polymers and vulcanized rubbers, according to the method of dynamic vulcanization, is known in the art and is described in particular in U.S. Pat. Nos. 3,758,643, 3,862,106, 3,037,954 and 3,806,558.

According to such a method the vulcanization of the elastomeric component is made to occur during the mixing or plasticization of the elastomeric component with a molten plastomeric polymer, by means of cross-linking agents which in general are of the conventional type, such as, for instance, peroxides, azidic compounds, mixtures of sulphur with zinc oxide, substituted ureas, thiocarbamates, etc.

If, in the mix which is thus treated, there is present a sufficient quantity of plastomeric polymer, the composition, at the end of the vulcanization of the elastomeric component, will maintain good processability characteristics under heat even at high percentages of vulcanized elastomer.

According to French Pat. No. 2,408,632, plastoelastomeric polyolefinic compositions may be obtained through dynamical vulcanization methods using as a cross-linking agent a halogenated phenolic resin, or a non-halogenated resin however associated to halogen-donors in combination with a metal oxide (activator).

According to said French patent, the mix of EPDM rubber and olefinic polymer with the phenolic resin in a proportion, with respect to the rubber, of from 5% to 20%, at a temperature sufficient for melting the olefinic polymer, is subjected to mastication after which it is additioned with the activator, thereupon carrying on the mastication at a temperature at which there occurs the cross-linking of the elastomeric component.

In this instance, the metal oxide, in particular zinc oxide, would favor the complete cross-linking of the elastomer, which is actually one of the objects of the process of said patent.

The compositions thus obtained through the dynamical vulcanization show, however, as a feature common with all the compositions based on mixes of plastomeric polymers wih cross-linked elastomers, the drawback of being so much more difficult to be processed or heat-molded, the higher the percentage of cross-linked elastomeric component present therein.

Moreover, in the compositions thus obtained, the elastomeric component shows easily a dishomogenization of the cross-linking due to the difficulty of homogeneously dispersing the vulcanizing agents in the composition at the melt temperature of the plastomeric component, before they become active at that temperature.

All these drawbacks reflect negatively on the processability properties under heat of the compositions thus obtained.

THE PRESENT INVENTION

One object of this invention is to provide a process for preparing, by dynamical vulcanization, thermoplastic elastomeric compositions consisting of a plastomeric olefinic polymer and an elastomeric copolymer at least partially cross-linked, which does not have the drawbacks and disadvantages of the prior art processes and which, in particular, results in compositions which exhibit a good processability under heating.

This and other objects are achieved by the present invention in accordance with which we have found that with the methods of dynamical vulcanization it is possible to obtain compositions of olefinic plastomers with EPDM rubbers, endowed, with respect to the compositions of the prior art, with an improved processability at an equal degree of cross-linking of the rubbery component, using as a cross-linking agent a system free of halogen donors and consisting, in particular, of a non-halogenated phenolic resin and a metal component as hereinafter defined.

More particularly, in such a cross-linking system the phenolic resin is present in a quantity of up to 10 parts by weight, but preferably is comprised between 1 and 5 parts by weight on 100 parts by weight of the elastomeric component present in the composition being prepared, while the metal compound is present in a ponderal relationship with the phenolic resin comprised between 0.5:1 and 5:1, but preferably comprised between 1:1 and 3:1.

For the purposes of this invention, there is used, as an elastomeric compound, a terpolymer of two α-olefinic monomers with a non-conjugated dienic monomer, this latter being present in a quantity comprised between 1% and 10% by weight on the total elastomer weight.

Examples of dienic monomers usable for the purposes are: 1,4-hexadiene; 2-methyl-1,4-pentadiene; 1,4,9-decatriene; 1,5-cyclooctadiene; 1-methyl-1,5-cyclooctadiene; 1,4-cycloheptadiene; dicyclopentadiene; ethylidene-norbornene; and the substitution derivatives of said monomers.

Examples of α-olefinic monomers are: ethylene; propylene; 1-butene; 1-pentene; 1-hexene; 4-methyl-1-pentene; 3-methyl-1-pentene; 3,3-dimethyl-1-butene; 3-methyl-1-hexene; and 2,4,4-trimethyl-1-pentene.

Among the terpolymers, the preferred ones are the ethylene-propylene-diene terpolymers containing from 25% to 50% by weight of units of copolymerized propylene.

As olefinic plastomers, there may be used the polymers obtained by the polymerization of one or more monoolefines by either low or high pressure processes, such as for instance: polyethylene; polypropylene; polybutene-1; poly-4-methyl-1-pentene; poly-1-hexene; poly-5-methyl-1-hexene; and poly-3-methyl-1-pentene.

The corresponding elastomeric component/plastomeric component ratios in the compositions may vary widely.

Thus, for instance, there may be used from 20% to 60% by weight of plastomeric polymer and from 80% to 40% by weight of elastomeric polymer on the mixture of the two.

Preferably, from 70% to 40% of elastomeric terpolymer and from 30% to 60% of plastomeric polymer, on the mix, are used.

The non-halogenated resins that are part of the vulcanizing system used for the purposes of this invention are compounds embraced in the following general formula:

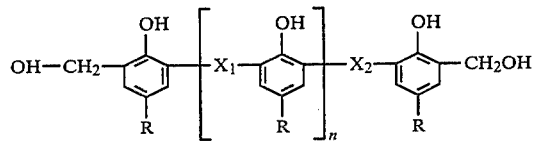

wherein:

$X_1$, $X_2$, the same or different, are —$CH_2$— radicals or —$CH_2$—O—$CH_2$— radicals;

R is an alkyl, aryl or alkenyl radical containing from 4 to 16 carbon atoms; and n is an integer comprised between 0 and 6, extremes included.

Said compounds are known to the prior art and may be prepared by condensation of alkylphenols with formaldehyde according to the techniques described in the literature, for instance in "Kunststoffe", vol. 52 (1962), p. 19–21.

Further references to such compounds and to their preparation can be found in: "Caoutchoues et Plastiques", No. 599, of March 1980, page 73, and in "Industrial and Engineering Chemistry", vol. 51, No. 8, August 1959, page 937.

The metal compounds which, together with the above mentioned phenolic resins, form the vulcanization system used for the purposes of this invention, are represented by zinc oxide, calcium, magnesium, and iron oxides, by titanium dioxide, by alumina, silicon dioxide and by calcium carbonate.

The present process for the preparation of the plasto-elastomeric compositions consists in masticating a mixture formed of from 20% to 60% by weight of an olefinic polymer and from 80% to 40% by weight of an unsaturated elastomeric terpolymer consisting of two α-olefinic monomers and of one dienic monomer, in the presence of a cross-linking system free of halogen donators and comprising, for 100 parts by weight of such a terpolymer, from 1 to 10 parts by weight of a non-halogenated phenolic resin as previously defined, and a metal compound, in a ponderal ratio, metal compound/phenolic resin comprised between 0.5:1 and 5:1, chosen from among: the oxides of zinc, magnesium, calcium, iron and titanium, calcium carbonate, silica and alumina, at a temperature sufficient for melting said olefinic polymer, and for a dwell time sufficient for obtaining a homogeneous mixture, and by then carrying on the mastication at a temperature at which there occurs an at least partial cross-linking of the elastomeric terpolymer.

The mastication and cross-linking process may be carried out either in a closed mixer or in an extruder or in a system consisting of a closed mixer combined with a granulator. It is also possible, however, to operate in a plurality of machines arranged in sequence, in the first set of which there is achieved a thorough mixing and homogenizing of the composition, while in the successive set of machines there is carried out the cross-linking, while still carrying on the mixing or mastication.

The mixing or mastication operation before cross-linking is aimed at obtaining a thorough and homogeneous mixing through of the elastomer in the form of particles having a size of one or a few microns, but preferably comprised between 0.5 and 1µ.

In general, the temperature at which the cross-linking occurs is comprised between 170° and 250° C.

The mastication time at the cross-linking temperature depends on the degree of cross-linking of the elastomer which is desired. Preferably, the quantity of cross-linked elastomer in the final composition is maintained between 30% and 90% by weight of the total quantity of elastomer present in the composition.

In the mix that is subjected to mastication and cross-linking there may be present mineral fillers, carbon black, colored pigments, plasticizers, stabilizing agents, extension oils, and in general any other classical ingredients of the compositions based on EPDM rubbers, provided that they are not halogen-donors.

By the term "halogen-donors" are meant such organic or inorganic halogenated compounds, also of the polymeric type, that are capable of yielding one or more halogen or halogenhydric acid atoms or molecules, under the above indicated cross-linking conditions.

Examples of such compounds are: metal halides, especially ferric chloride and stannous chloride, the halides of organo-stannic compounds, chlorinated paraffins, the halogenated resins and rubbers such as chlorinated polyethylene or chlorosulphonate, polychlorobutadiene, etc.

The following examples are given to illustrate the invention in more detail, and are not intended to be limiting.

EXAMPLE 1

Operating in a closed mixer, there were prepared plasto-elastomeric compositions, using the following components in the quantities indicated in Table 1:

EPDM elastomer, consisting of 28% b.w. of propylene, 67.2% by weight of ethylene and 4.8% b.w. of ethylidenenorbornene, said elastomer having a density of 0.87 g/cc, a Mooney (ML 121° C.) viscosity of 28, and extended with 30% by weight of paraffin oil;

polypropylene;

phenol-formaldehyde resin of the resolic type, of the formula:

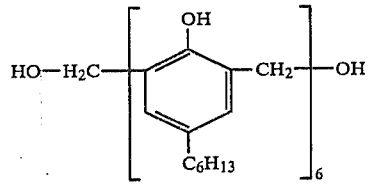

zinc oxide.

The polymeric compounds were fed all together into the mixer and, after a short period of mixing, the mixture was additioned with phenolic resin and then with zinc oxide.

The mixing operation was continued until achieving the melting of the polypropylene (i.e., at about 165° C.) and was then carried on until attaining cross-linking of the elastomer to the desired degree.

The temperature attained in the cross-linking stage was comprised between 180° and 200° C.

The composition was then discharged from the mixer and subjected to the following determinations:

% of cross-linked EPDM, by means of solubility tests in xylol at 125° C.;

processability by measuring the head pressure in extrusion tests in an extruder.

In those tests:

the extruder was of the TR 1S type and operated at a temperature of 230° C., with a spinneret of 2 mm diameter and a screw ratio L/D of 20, and with an output rate of 6.8 g/minute.

tension set at 75%, measured at 100° C., according to ASTM D-412 rules, on a test piece punched out from an injection-molded ASTM specimen.

Table 1 records, besides the quantities of the components used in the mixing, also the characteristics of the compositions obtained.

TABLE 1

|  | 1 | 2 | 3 | 4 | 5 | 6 | 7 | 8 | 9 | 10 |
|---|---|---|---|---|---|---|---|---|---|---|
| EPDM elastomer (parts by weight containing 30% of extension oil) | 80 | 80 | 80 | 80 | 80 | 80 | 80 | 60 | 60 | 60 |
| Polypropylene (parts by weight) | 20 | 20 | 20 | 20 | 20 | 20 | 20 | 40 | 40 | 40 |
| Phenolic resin (parts by weight) | — | 1 | 1 | 2 | 2 | 2 | 0.6 | 2 | 2 | 2 |
| Zince oxide (parts by weight) | — | — | 1 | — | 2 | 6 | 1.8 | 2 | 4 | 6 |
| Characteristics of composition | | | | | | | | | | |
| Cross-linked EPDM (in %) | 0 | 62 | 60.3 | 86.4 | 85.3 | 83.8 | 50.3 | 81.3 | 80.9 | 80.8 |
| Head pressure at the extruder (kg/sq. cm) | 70 | 195 | 170 | 240 | 200 | 170 | 135 | 92 | 81 | 70 |
| Tension set 75% (%) | 32 | 12 | 13 | 9 | 10 | 10 | 14 | 24 | 24 | 24 |

EXAMPLE 2

Example 1 was repeated, except that as an elastomer there was used an EPDM elastomer containing 29% by weight of propylene, 67.5% by weight of ethylene and 3.5% by weight of ethylidenenorbornene, having a density equal to 0.8 g/cc, a Mooney viscosity (ML 121° C.) of 65 and not extended with oils.

Table 2 records the quantities of the components used in the mixing, and the characteristics of the compositions obtained.

ponents and phenolic resins, in the quantities indicated in Table 3:

EPDM elastomer of Example 1, expanded with 30% by weight of paraffin oil;

polypropylene similar to that of Example 1;

polyethylene having a density of 0.960 g/cc;

non-halogenated phenolic resin, similar to the one of Example 1;

bromided phenolic resin of the formula:

$$Br-CH_2-\left[\begin{array}{c}OH\\ \text{(ring with }CH_2\text{, }Br\text{ (3/7), }C_3H_7\text{)}\end{array}\right]_7-Br$$

The operating conditions were similar to those indicated in Example 1.

TABLE 2

|  | 1 | 2 | 3 | 4 | 5 | 6 |
|---|---|---|---|---|---|---|
| EPDM elastomer parts by weight | 70 | 70 | 70 | 60 | 50 | 40 |
| Polypropylene parts by weight | 30 | 30 | 30 | 40 | 50 | 60 |
| Phenolic resin parts by weight | 0.7 | 0.7 | 3.4 | 2 | 2 | 2 |
| Zinc oxide parts by weight | 0.7 | 2.1 | 10.2 | 2 | 2 | 2 |
| Characteristics of composition | | | | | | |
| Cross-linked EPDM (%) | 41.2 | 40.3 | 79.8 | 77.6 | 54.5 | 48.1 |
| Head pressure at the extruder (kg/sq. cm) | 140° | 120° | 160° | 215 | 175 | 130 |
| Tension set 75% (%) | 29 | 30 | 22 | 25 | 35 | 40 |
| Elastical modulus under bending (kg/sq. cm)°° | — | — | — | 3600 | 5500 | 7000 |
| Degree°°° (g/10 min.) | — | — | — | 30 | 100 | 300 |

°Determined with a flow rate in the extruder of 2.5 g/min. (instead of 6.8 g/min.)
°°Determined according to ASTM D 790 rules on injection-molded test piece
°°°Determined at 210° C., under a load of 21.6 kg.

EXAMPLE 3

Using a closed mixer, plasto-elastomeric compositions were prepared from the following polymeric com- Table 3 records the components used in the mixing and their quantity, as well as the characteristics of the compositions obtained, determined according to the procedures described in Example 1, unless otherwise indicated.

TABLE 3

|  | 1 | 2 | 3 | 4 | 5 | 6 |
|---|---|---|---|---|---|---|
| EPDM elastomer parts by weight (inclusive of extension oil) | 80 | 80 | 80 | 80 | 80 | 80 |
| Polypropylene parts by weight | 20 | 20 | 20 | 20 | 20 | — |
| Polyethylene parts by weight | — | — | — | — | — | 20 |
| Non-halogenated phenolic resin parts b.w. | — | 2 | 2 | 2 | — | 0.6 |
| Bromided phenolic resin parts b.w. | 2 | — | — | — | — | — |
| ZnO parts b.w. | 2 | — | — | — | — | 1.8 |
| Al$_2$O$_3$ parts b.w. | — | — | 2 | — | — | — |
| MgO parts b.w. | — | 2 | — | — | — | — |
| SiO$_2$° parts b.w. | — | — | — | 2 | — | — |
| CaCO$_3$ parts b.w. | — | — | — | — | 2 | — |
| Characteristics of the composition | | | | | | |

TABLE 3-continued

|  | 1 | 2 | 3 | 4 | 5 | 6 |
|---|---|---|---|---|---|---|
| Cross-linked EPDM (%) | 86 | 78 | 84 | 71 | 80 | 50.6 |
| Head pressure at the extruder (kg/sq. cm) | 270 | 195 | 160 | 170 | 180 | 160 |
| Tension set 75% (%) | 10 | 16 | 16 | 17 | 14 | 10°° |

*KS 300, produced by Hoechst Co.
**Determined at 100° C., according to ASTM D-412, on a test piece punched out from a compression molded plate molded at 200° C. (1 + 8 minutes)

We claim:

1. Process for the preparation of plasto-elastomeric compositions, consisting in subjecting to mastication a mix consisting of 20% to 60% by weight of an olefinic polymer, and from 80% to 40% by weight of an unsaturated elastomeric terpolymer consisting of two α-olefinic monomers and of a dienic monomer, in the presence of a cross-linking system free of halogen donors and comprising:

(a) from 1 to 10 parts by weight, for 100 parts by weight of said terpolymer, of a non-halogenated phenolic resin of the following general formula:

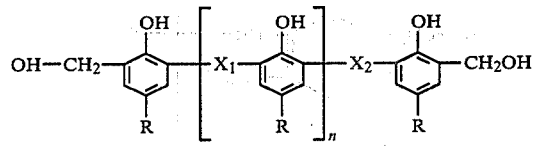

wherein:

X$_1$, X$_2$, the same or different, are —CH$_2$— or —CH$_2$—O—CH$_2$— radicals;

R is an alkyl, aryl or alkenyl radical containing from 4 to 16 carbon atoms;

n is an integer comprised between 0 and 6, extremes excluded; and (b) a metal compound selected from zinc oxide, magnesium oxide, iron oxide, titanium dioxide, calcium oxide, aluminum, silicon and calcium carbonate oxides, in a ponderal ratio with the phenolic resin comprised between 3 and 5;

at a temperature sufficient to melt said olefinic polymer and for a time sufficient for obtaining a homogeneous mixture, and by then continuing the mastication at a temperature at which there occurs at least a partial cross-linking of the elastomeric terpolymer.

2. The process of claim 1, characterized in that said mixture contains from 70% to 40% by weight of elastomeric terpolymer and from 30% to 60% by weight of plastomeric polymer.

3. The process according to claims 1 or 2, characterized in that the elastomeric terpolymer is an ethylene/propylene/diene terpolymer containing from 25% to 50% by weight of copolymerized propylenic units.

4. The process of claim 1, characterized in that the phenolic resin is used in an amount comprised between 1 and 5 parts by weight on 100 parts by weight of the elastomeric terpolymer.

5. Plasto-elastomeric compositions prepared according to the process of claim 1.

* * * * *